United States Patent
Duquette et al.

(10) Patent No.: US 7,690,695 B2
(45) Date of Patent: Apr. 6, 2010

(54) SEALING FITTING AND SEAL SEAT FOR STAINLESS STEEL TUBING

(75) Inventors: Scott Duquette, Enfield, CT (US); Brian R. Kraft, Palmer, MA (US)

(73) Assignee: Titeflex Corporation, Springfield, MA (US)

( * ) Notice: Subject to any disclaimer, the term of this patent is extended or adjusted under 35 U.S.C. 154(b) by 0 days.

(21) Appl. No.: 11/182,803

(22) Filed: Jul. 18, 2005

(65) Prior Publication Data

US 2008/0007049 A1 Jan. 10, 2008

(51) Int. Cl.
*F16L 21/06* (2006.01)

(52) U.S. Cl. .................. 285/322; 285/249; 285/903

(58) Field of Classification Search .............. 285/903, 285/322, 354, 249

See application file for complete search history.

(56) References Cited

U.S. PATENT DOCUMENTS

| | | | |
|---|---|---|---|
| 2,757,943 | A | 8/1956 | Henderson |
| 2,850,303 | A | 9/1958 | Bauer |
| 2,946,607 | A | 7/1960 | Bauer |
| 3,445,128 | A | 5/1969 | Teeters |
| 4,229,025 | A | 10/1980 | Volgstadt et al. |
| 4,469,122 | A | 9/1984 | Meek |
| 4,613,172 | A | 9/1986 | Schattmaier |
| 4,875,720 | A | 10/1989 | Sasa et al. |
| 4,907,830 | A | 3/1990 | Sasa et al. |
| 5,466,019 | A | 11/1995 | Komolrochanaporn |
| 5,799,989 | A | 9/1998 | Albino |
| 5,845,946 | A | 12/1998 | Thomas |
| 5,857,716 | A | 1/1999 | Thomas |
| 6,019,399 | A | 2/2000 | Sweeney |
| 6,036,237 | A | 3/2000 | Sweeney |
| 6,079,749 | A | 6/2000 | Albino et al. |
| 6,102,445 | A | 8/2000 | Thomas |
| 6,173,995 | B1 | 1/2001 | Mau |
| 6,276,728 | B1 | 8/2001 | Treichel |
| 6,315,003 | B1 | 11/2001 | Albino |

(Continued)

FOREIGN PATENT DOCUMENTS

EP 0 545 410 A1 6/1993

(Continued)

OTHER PUBLICATIONS

*Titeflex Corporation v. Design by Analysis, Inc. et al.*; First Amended Complaint dated May 23, 2007 in US District Court for District of Massachusetts; Civil Action No. 06-30027-MAP.

(Continued)

*Primary Examiner*—David E Bochna
(74) *Attorney, Agent, or Firm*—Foley & Lardner LLP

(57) ABSTRACT

A fitting assembly for forming a fluid-tight seal with an end of a stainless steel tube is provided with a seal seat that is composed of a material that is harder than the material that the stainless steel tube is composed of. The stainless steel tube may be gripped between a bushing and the seal seat to form a fluid-tight seal with the stainless steel tube. The fitting assembly may be tightened so that the stainless steel tube is deformed between the bushing and the seal seat of the fitting assembly.

20 Claims, 3 Drawing Sheets

U.S. PATENT DOCUMENTS

| | | | |
|---|---|---|---|
| 6,357,801 | B1 | 3/2002 | Takahashi et al. |
| 6,428,052 | B1 | 8/2002 | Albino et al. |
| 6,532,993 | B2 | 3/2003 | Albino |
| 6,695,353 | B1 | 2/2004 | Treichel |
| 6,764,107 | B1 | 7/2004 | Obahi et al. |
| 6,877,781 | B2 * | 4/2005 | Edler .................. 285/354 |
| 6,908,114 | B2 * | 6/2005 | Moner .................. 285/23 |
| 7,055,868 | B2 * | 6/2006 | Watanabe ............ 285/249 |
| 2002/0079702 | A1 | 6/2002 | Baumann et al. |
| 2003/0067169 | A1 | 4/2003 | Church |
| 2004/0066040 | A1 | 4/2004 | Bennett et al. |
| 2004/0155463 | A1 | 8/2004 | Moner |
| 2007/0013189 | A1 | 1/2007 | Duquette et al. |
| 2007/0018449 | A1 | 1/2007 | Golafshani |
| 2007/0018450 | A1 | 1/2007 | Golafshani |
| 2007/0284878 | A1 | 12/2007 | Duquette et al. |
| 2008/0012300 | A1 | 1/2008 | Duquette et al. |

FOREIGN PATENT DOCUMENTS

| | | | | |
|---|---|---|---|---|
| EP | 545410 | * | 6/1993 | ............ 285/903 |

OTHER PUBLICATIONS

*Titeflex Corporation* v. *Design by Analysis, Inc. et al.*; Civil Docket Report dated Nov. 28, 2007 in US District Court for District of Massachusetts; Civil Action No. 06-30027-MAP.

*Titeflex Corporation* v. *Design by Analysis, Inc. et al.*; Joint Proposed Protective Order dated Aug. 18, 2006 in US District Court for District of Massachusetts; Civil Action No. 06-30027-MAP.

Property Comparison Tables: Hardness and Tensile Properties, Copyright 2003, American Society of Materials, Int., accessed via http://products.asminternational.org/hbk/do/highlight/content/V08_2000/D50/A01/index.html on Mar. 21, 2009. (11 pgs.).

*Titeflex Corporation* v. *Design by Analysis, Inc. et al.*; Civil Docket Report dated Nov. 28, 2007 in US District Court for District of Massachusetts; Civil Action No. 06-30027-MAP.

*Titeflex Corporation* v. *Design by Analysis, Inc. et al.*; Joint Proposed Protective Order dated Aug. 18, 2006 in US District Court for District of Massachusetts; Civil Action No. 06-30027-MAP.

Office Action mailed Mar. 23, 2009, in U.S. Appl. No. 11/183,189.

S. Duquette et al., U.S. PTO Office Action, U.S. Appl. No. 11/183,189 dated Jan. 25, 2008.

S. Duquette et al., U.S. PTO Office Action, U.S. Appl. No. 11/183,189 dated Mar. 23, 2009.

S. Duquette et al., U.S. PTO Office Action, U.S. Appl. No. 11/183,189 dated Apr. 19, 2007.

S. Duquette et al., U.S. PTO Office Action, U.S. Appl. No. 11/183,189 dated Sep. 16, 2008.

S. Duquette et al., U.S. PTO Office Action, U.S. Appl. No. 11/247,326 dated Nov. 28, 2008.

S. Duquette et al., U.S. PTO Office Action, Serial No. 11/183,189 dated Sep. 2, 2009.

* cited by examiner

SEALING FITTING AND SEAL SEAT FOR STAINLESS STEEL TUBING

BACKGROUND

The present invention relates to a fitting assembly and seal seat for forming a fluid-tight seal with an end of a stainless steel tube.

In a conventional fitting design for sealing an end of a stainless steel tube, the fitting is sensitive to the quality of the cut end of the stainless steel tube. The stainless steel tube is typically cut in the field and the quality of this cut is difficult to control. Poor cuts may lead to leaks in a piping system with a conventional design. A poor cut that contains burrs may damage the seal seat area of the fitting. Furthermore, users of a fitting assembly may over-tighten the fitting in an attempt to eliminate a leak, possibly damaging the seal seat area of the fitting in the process.

Furthermore, conventional designs are typically sensitive to foreign materials caught inside the adapter body. Such foreign materials may cause difficulties with forming a fluid-tight seal with a stainless steel tube and may cause permanent damage to the fitting.

SUMMARY OF THE INVENTION

It is an object of the present invention to provide an improved fitting assembly and seal seat for sealing an end of a stainless steel tube to create a fluid-tight seal. It is an object of the present invention to provide an improved fitting assembly and seal seat that are less sensitive to poorly cut ends of stainless steel tubes and foreign materials, allowing the fitting assembly and seal seat to resist damage and form fluid-tight seals. Fluids may include gases and liquids.

According to an embodiment of the present invention, a fitting assembly for forming a fluid-tight seal with a stainless steel tube may include a nut, a gripping device, an adapter, and a seal seat, wherein the seal seat is composed of a material that is harder than a material that the stainless steel tube is composed of.

According to an embodiment of the present invention, a seal seat for forming a fluid-tight seal with a stainless steel tube may include a seal seat, wherein the seal seat is composed of a material that is harder than the material that the stainless steel tube is composed of.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
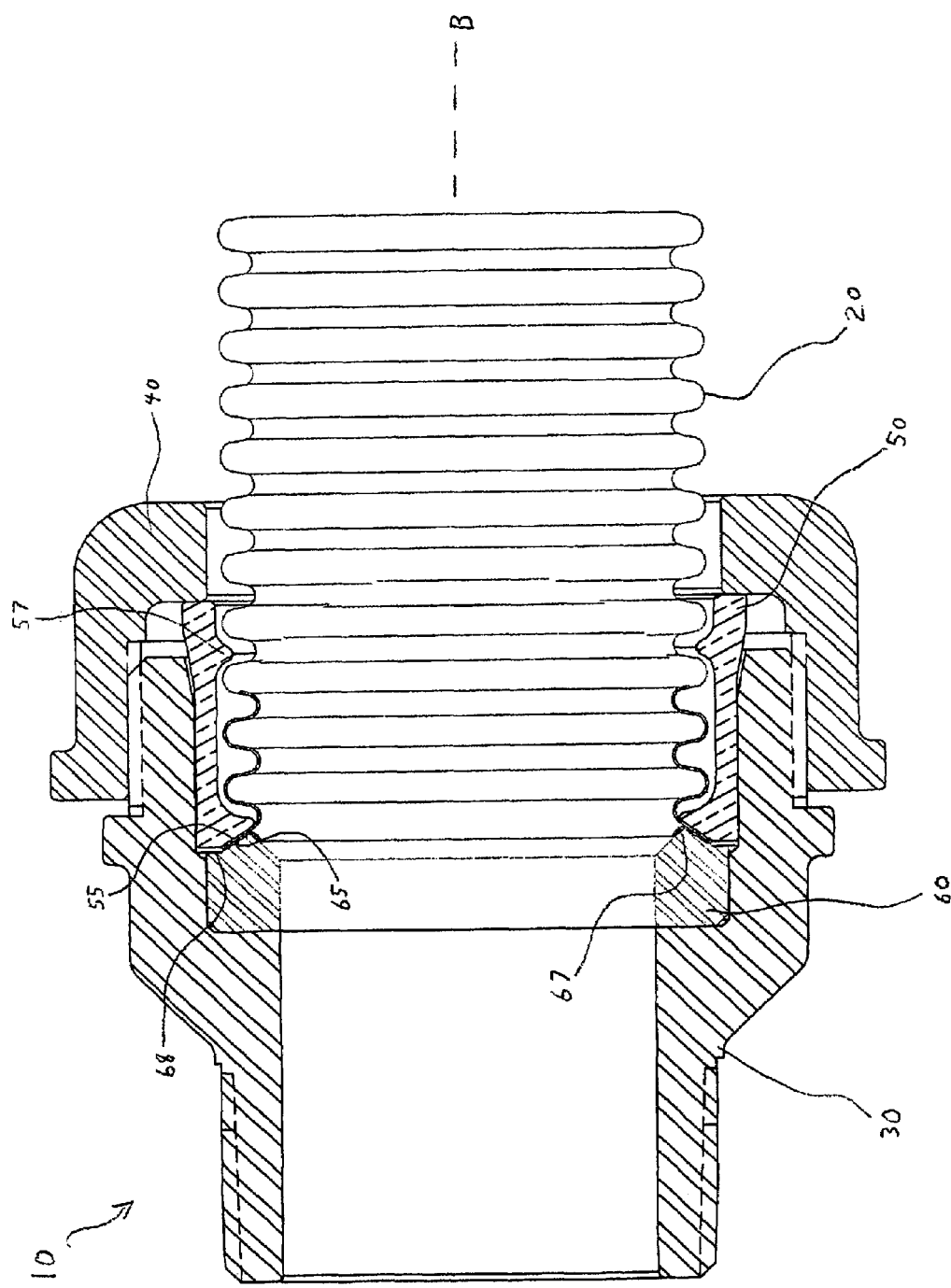
FIG. 1 is a sectional view of a fitting assembly according to an embodiment of the present invention.

FIG. 1 shows a fitting assembly according to an embodiment of the present invention. The fitting assembly 10 may be used to seal an end of a stainless steel tube 20 to create a fluid-tight seal. In the example shown in FIG. 1, a corrugated stainless steel tube is shown. The stainless steel tube 20 may have one of its ends cut in preparation to form a seal with the fitting assembly 10. The fitting assembly 10 may include an adapter 30 and a nut 40. The adapter may include a bushing 50 as well.

FIG. 1 shows an example of a state in which a stainless steel tube 20 has been inserted into the fitting assembly 10. In normal operation the stainless steel tube 20 is inserted into the fitting assembly 10 by first removing the nut 40 from the adapter 30. The bushing 50 may be then removed from the nut 40 or from the adapter 30. The bushing 50 may be a unitary piece or have a design of two or more pieces. The bushing 50 may be separate from the nut 40 or the bushing 50 may be attached to the nut 40. The bushing 50 may then be placed over the outer diameter of the stainless steel tube 20 and the stainless steel tube 20 and bushing 50 may then be inserted into the adapter 30. The nut 40 may then be screwed onto the adapter 30 to assemble the fitting assembly 10.

Conventionally, adapters have been made as a one-piece part machined from a material that is softer than the material that the stainless steel tube 20 is composed of. Because these adapters are softer than the material that the stainless steel tube 20 is composed of, these adapters are sensitive to the quality of the cut end of the stainless steel tube and to foreign materials.

In an embodiment of the present invention, the adapter 30 includes a seal seat 60 that is composed of a material that is harder than the material that the stainless steel tube 20 is composed of. Because the seal seat 60 is composed of a material that is harder than the material that the stainless steel tube 20 is composed of, the seal seat 60 is less sensitive to the quality of the cut end of the stainless steel tube 20 and the seal seat 60 is less sensitive to foreign materials. The seal seat 60 is less likely to be damaged by a poorly cut end of the stainless steel tube 20 and the seal seat 60 is less likely to be damaged by foreign materials.

In an embodiment of the present invention, the fitting assembly 10 is composed of a material that is harder than the material that the stainless steel tube 20 is composed of. For example, the adapter 30, including the seal seat 60, and the bushing 50 may be composed of a material that is harder than the material that the stainless steel tube is composed of.

In an embodiment of the present invention, the adapter 30 may be composed of a different material than the material that the seal seat 60 is composed of. For example, the adapter 30 may be composed of ductile iron, cast iron, brass, coated carbon steel, or other materials commonly used in the fitting art. The seal seat 60 may be composed of tool steels, martensitic stainless steels, alloy steels, and other alloys that are harder than the material that the stainless steel tube 20 is composed of. In a preferred embodiment of the present invention the seal seat 60 is composed of a martensitic stainless steel or tool steel that is in a hardened condition.

In an embodiment of the present invention, the seal seat 60 may be attached to the adapter 30. For example, the seal seat 60 may be press fit, brazed, welded, fastened, or joined by other processes known in the art.

The fitting assembly 10 may provide a hex-shaped area for wrenching and tightening the fitting assembly, or the fitting assembly may provide a cylindrical area for wrenching with a pipe wrench.

After a stainless steel tube 20 has been inserted into the fitting assembly 10 and the fitting assembly 10 has been assembled together, the nut 40 may be tightened onto the adapter 30 to form a fluid-tight seal between the fitting assembly 10 and the stainless steel tube 20. When the nut 40 is tightened onto the adapter 30, the stainless steel tube 20 may be pressed between the bushing 50 and the seal seat 60. For example, the stainless steel tube 20 may be pressed between a bushing surface 55 and a seal seat surface 65. In this way, the stainless steel tube 20 may be gripped by the bushing 50 and the seal seat 60 to form a fluid-tight seal with the stainless steel tube 20.

Once the stainless steel tube 20 is sealed between the bushing 50 and the seal seat 60, the nut 40 may be tightened further onto the adapter 30, causing the stainless steel tube to deform between the bushing 50 and the seal seat 60. For example, tightening the nut 40 further may press the stainless steel tube 20 between the bushing surface 55 and the seal seat surface 65 so that the stainless steel tube 20 deforms and creates a fluid-tight seal with the fitting assembly 10. The surfaces of the bushing 50 and the seal seat 60 may be angled and sloped to aid with the sealing and/or deformation of the stainless steel tube 20.

The stainless steel tube 20 may be cut so that it abuts against the seal seat surface 65 or the stainless steel tube 20 may be cut so that it abuts against the seal seat surface 65 and wraps around the seal seat 60 to also abut an inner surface 67. The seal seat surface 65 may be shaped so that it is angled to a longitudinal axis B of the stainless steel tube 20. The inner surface 67 may be shaped so that it is angled to a longitudinal axis B of the stainless steel tube 20. Perpendicular surface 68 may be shaped so that it is perpendicular to the longitudinal axis B of the stainless steel tube 20.

The bushing 50 may include one or more protrusions 57 for gripping and sealing with the exterior of the stainless steel tube 20. The stainless steel tube 20 may be a corrugated tube or a straight tube.

Other gripping devices may be used instead of the nut 40 and the bushing 50 shown in the example of FIG. 1. For example, a nut-integrated collet, a colleted nut, a slip or other types of rings, and other gripping devices known in the fitting arts may be used.

Figure 2:
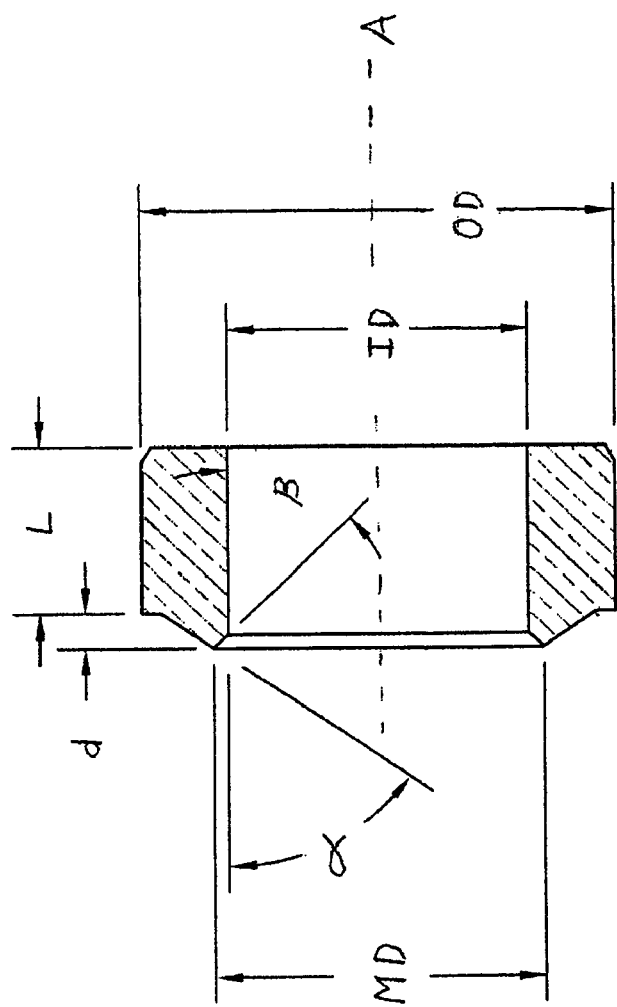
FIG. 2 is a sectional view of a seal seat according to an embodiment of the present invention.
Figure 3:
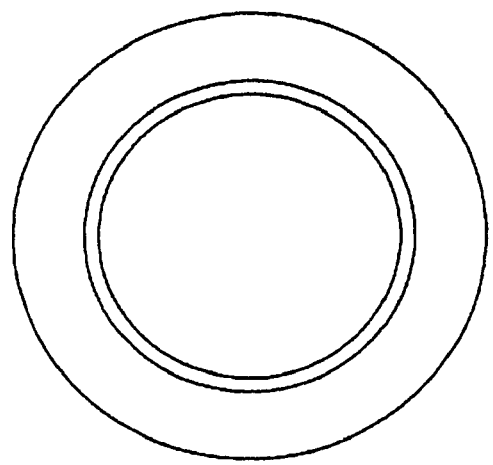
FIG. 3 is an end view of a seal seat according to an embodiment of the present invention.

FIG. 2 shows a sectional view of the seal seat 60 according to an embodiment of the present invention. FIG. 3 shows an end view of the seal seat 60 according to an embodiment of the present invention. The seal seat 60 may have an inner diameter ID, an outer diameter OD, a mouth diameter MD, and a length L. The dimensions of the seal seat 60 may be selected in accordance with the dimensions of the adapter 30 and other components of the fitting assembly 10, and to promote sealing and/or deformation of the stainless steel tube 20 to form a fluid-tight seal.

For example, the seal seat 60 may have an inner diameter ID of 0.562 inches, an outer diameter OD of 0.882 inches, a mouth diameter MD of 0.615-0.617 inches, and a length L of 0.323 inches.

The surfaces of the seal seat 60 may be dimensioned in accordance with other components of the fitting assembly 10 and to promote the sealing and/or deformation of the stainless steel tube 20 to form a fluid-tight seal. A sloped face of the seal seat may have a depth d and form angles $\alpha$ and $\beta$ with a longitudinal axis A of the seal seat 60.

For example, the seal seat 60 may have a sloped face with a depth d of 0.069 inches, an angle $\alpha$ of 55°, and an angle $\beta$ of 45°.

Figure 4:
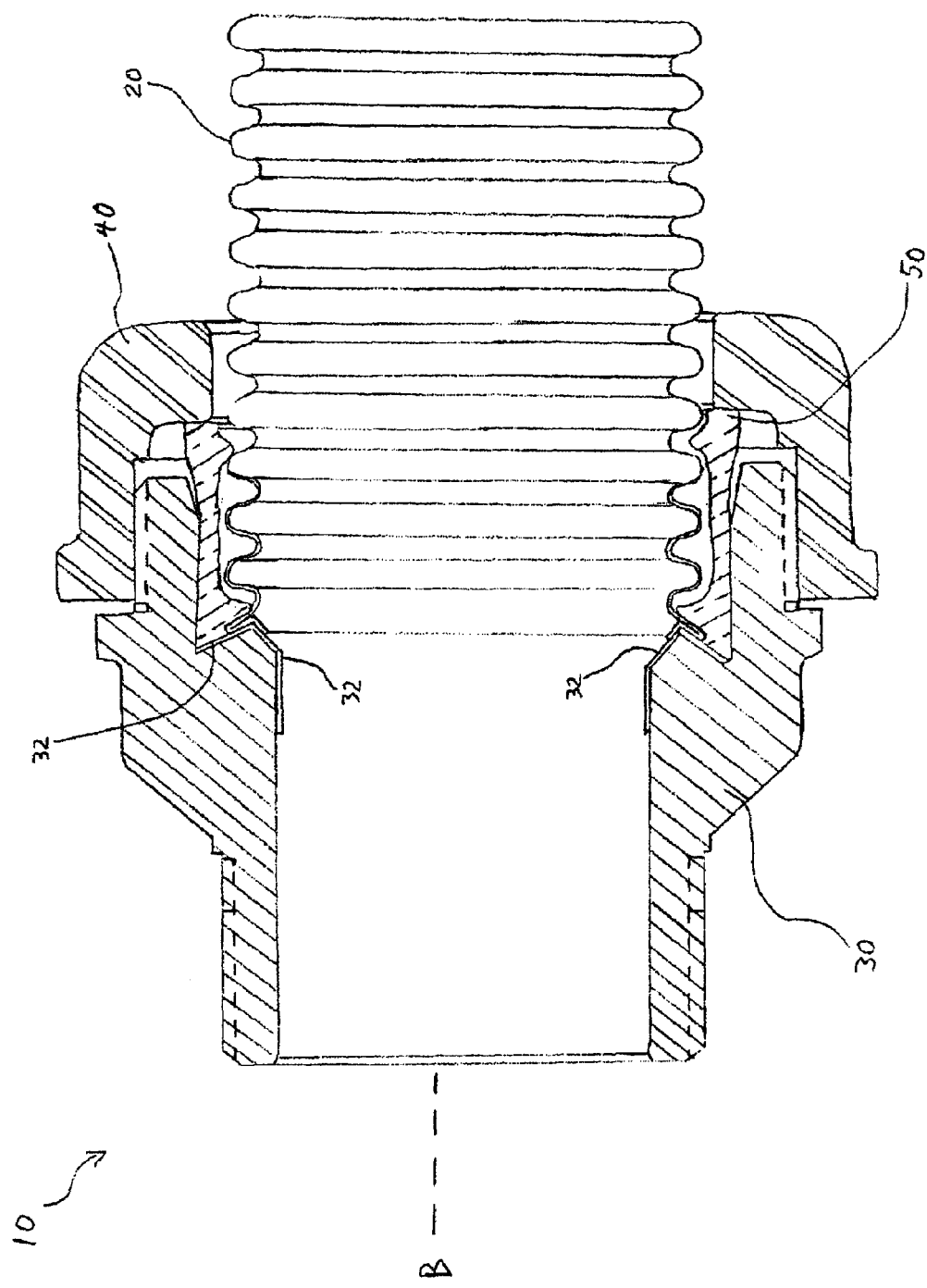
FIG. 4 is a sectional view of a fitting assembly according to an embodiment of the present invention.

FIG. 4 shows a sectional view of a fitting assembly 10 according to an embodiment of the present invention. In the example shown in FIG. 4, the adapter 30 is composed of a single piece that includes a portion that corresponds to the seal seat 60 described above. The adapter 30 includes a coating 32 that has been applied to the areas of the adapter 30 that will contact with the stainless steel tube 20 to form a seal. The coating 32 may be composed of a wear-resistant material or a material that is harder than the stainless steel tube 20. Because the coating 32 is composed of a material that is harder than the material that the stainless steel tube 20 is composed of, the fitting assembly 10 is less sensitive to the quality of the cut end of the stainless steel tube 20 and the fitting assembly 10 is less sensitive to foreign materials. Because the adapter 30 includes the coating 32, the adapter 30 is less likely to be damaged by a poorly cut end of the stainless steel tube 20 and the adapter 30 is less likely to be damaged by foreign materials.

The coating 32 may applied to the adapter by electroplating, dipping, sputtering, chemical vapor deposition (CVD), thermal spraying, or by other coating processes known in the art.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A fitting assembly for forming a fluid-tight seal with a stainless steel tube, comprising:
   a gripping device;
   an adapter;
   a seal seat to be placed adjacent to a cut end of the stainless steel tube;
   wherein the seal seat is composed of a material that is harder than a material that the stainless steel tube is composed of;
   wherein the seal seat is an insert placed within the adapter;
   wherein the seal seat comprises at least two surfaces, with each of the two surfaces being aligned at a non-zero angle to a longitudinal axis of the stainless steel tube and with the angles of the two surfaces being different; and
   wherein the two surfaces are angled towards one another to form a generally triangular front portion of the seal seat.

2. The fitting assembly of claim 1, wherein the seal seat is composed of a different material than the adapter.

3. The fitting assembly of claim 1, wherein the seal seat is attached to the adapter.

4. The fitting assembly of claim 1, wherein the seal seat is composed of martensitic stainless steel.

5. The fitting assembly of claim 1, wherein the seal seat is composed of a tool steel.

6. The fitting assembly of claim 1, wherein the gripping device comprises a bushing.

7. The fitting assembly of claim 1, wherein the gripping device includes at least one protrusion for gripping and sealing with the stainless steel tube.

8. The fitting assembly of claim 1, wherein the fitting assembly is adapted to seal with a corrugated stainless steel tube.

9. The fitting assembly of claim 1, wherein the fitting assembly is adapted to seal with a straight stainless steel tube.

10. A fitting assembly for forming a fluid-tight seal with a stainless steel tube, comprising:
   a gripping device;
   an adapter; and
   a seal seat to be placed adjacent to a cut end of the stainless steel tube;
   wherein the seal seat is composed of a material that is harder than a material that the stainless steel tube is composed of;
   wherein the seal seat is an insert placed within the adapter;
   wherein the seal seat is coated with a coating material, wherein the coating material is harder than the material that the stainless steel tube is composed of, wherein the coating material is different than the seal seat material.

11. A seal seat for forming a fluid-tight seal with a stainless steel tube, comprising:
   a seal seat to be positioned adjacent to a cut end of the stainless steel tube,
   wherein the seal seat is composed of a material that is harder than the material that the stainless steel tube is composed of;
   wherein the seal seat is an insert that is configured to be placed within an adapter;
   wherein the seal seat comprises at least two surfaces, with each of the two surfaces being aligned at a non-zero angle to a longitudinal axis of the stainless steel tube and with the angles of the two surfaces being different; and
   wherein the two surfaces are angled towards one another to form a generally triangular front portion of the seal seat.

12. The seal seat of claim 11, wherein the seal seat is composed of hardened martensitic stainless steel.

13. The seal seat of claim 11, wherein the seal seat is composed of a hardened tool steel.

14. The seal seat of claim 11, wherein at least a portion of one of the two surfaces is sloped or conical, and wherein the portion of the surface is adapted to seal with the stainless steel tube.

15. The seal seat of claim 11, wherein at least a portion of one of the two surfaces is adapted to seal with the stainless steel tube.

16. The seal seat of claim 11, wherein at least a portion of a surface of the seal seat is perpendicular to the longitudinal axis of the stainless steel tube.

17. The seal seat of claim 11, wherein the seal seat is configured as a separate piece from the adapter.

18. A fitting assembly for forming a fluid-tight seal with a stainless steel tube, comprising:
   a gripping device;
   an adapter; and
   a seal seat to be placed adjacent to a cut end of the stainless steel tube;
   wherein the seal seat is composed of a material that is harder than a material that the stainless steel tube is composed of;
   wherein the seal seat is coated with a coating material, wherein the coating material is harder than the material that the stainless steel tube is composed of, wherein the coating material is different than the seal seat material.

19. The fitting assembly of claim 18, wherein the adapter and seal seat form a single piece adapter.

20. The fitting assembly of claim 18, wherein the fitting assembly is composed of a material that is harder than the material that the stainless steel tube is composed of.

* * * * *